Aug. 14, 1923.
H. G. MILLER
OIL BURNER
Filed June 23, 1921
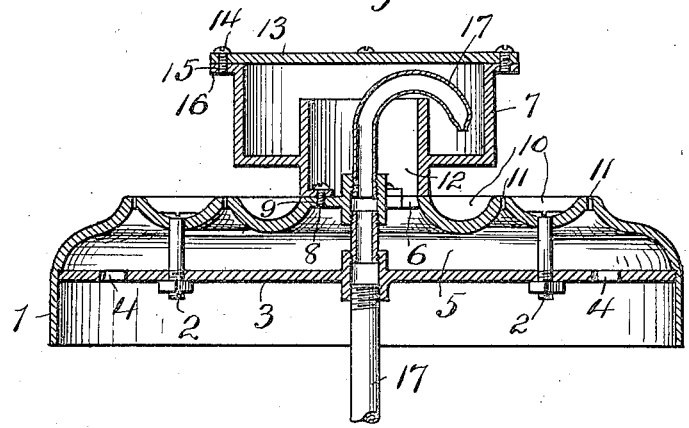
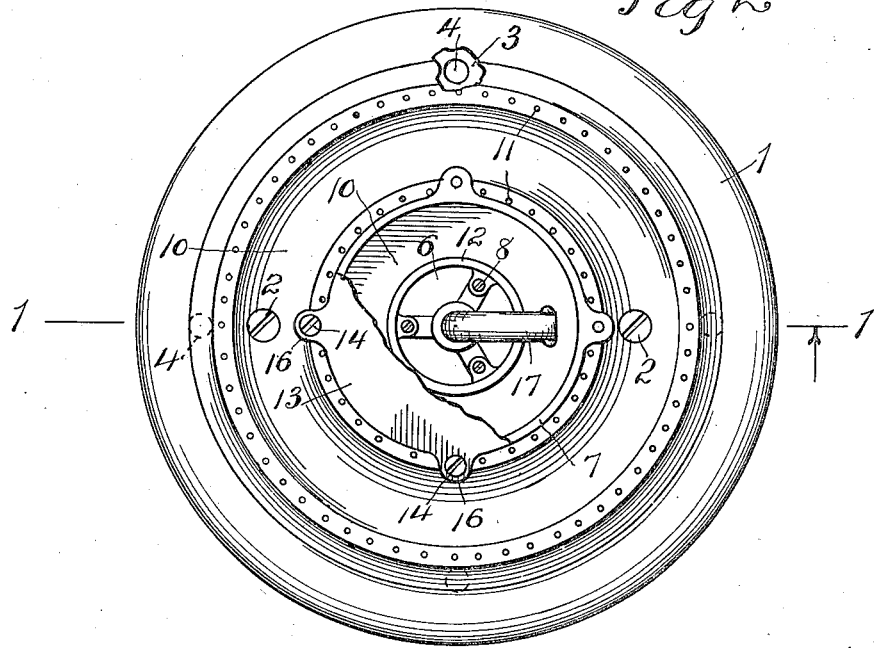
Inventor,
Harry G. Miller,
By Warren D. House,
His Attorney.
Witness:
R. E. Hamilton Patented Aug. 14, 1923.

1,464,995

UNITED STATES PATENT OFFICE.

HARRY G. MILLER, OF KANSAS CITY, MISSOURI.

OIL BURNER.

Application filed June 23, 1921. Serial No. 479,800.

*To all whom it may concern:*

Be it known that I, HARRY G. MILLER, a citizen of the United States, residing at Kansas City, in the county of Jackson and State of Missouri, have invented a certain new and useful Improvement in Oil Burners, of which the following is a specification.

My invention relates to improvements in oil burners.

The object of my invention is to provide a novel burner of the kind described, which is simple in construction, cheap to make, durable and not liable to get out of order.

A further object of my invention is to provide a burner of the kind described, which can be easily and readily installed and which is efficient in operation.

The novel features of my invention are hereinafter fully described and claimed.

In the accompanying drawing, which illustrates the preferred embodiment of my invention, Fig. 1 is a cross section of my improved burner on the line 1—1 of Fig. 2.

Fig. 2 is a top view, partly broken away, of my improved burner.

Similar reference characters designate similar parts in the different views.

1 designates a circular body, which has secured to it by screws 2 a bottom plate 3, having air inlet openings 4 and which with the body forms a mixing chamber 5, having an opening 6.

A closed removable vapor receptacle 7 supported by and above said body is rigidly secured to the body 1 by screws 8 fitted in threaded holes 9, in the body. The vapor receptacle is provided with a vertical tubular extension 12, which communicates with the mixing chamber 5 through the opening 6 and which extends into the vapor receptacle and is spaced apart from the top side thereof. By having the extension 12 extending above the bottom of said vapor receptacle, a trap is provided which prevents the oil from passing through the opening 6 into the mixing chamber 5 before the oil is vaporized.

The body 1 is provided on the top side with discharge means comprising holes 10, which communicate with the mixing chamber. The body 1 is also provided with oil receiving grooves 11 which are located in the top side of the body adjacent to the discharge means, said grooves being adapted to receive and hold a priming charge.

In order that the vapor receptacle may be easily and readily cleaned of any foreign substance which may accumulate, I provide a removable top 13, which is normally held in place by screws 14, which are fitted in threaded holes 15 in lateral projections 16, adjacent to the top side of said receptacle.

For supplying fuel to the vapor receptacle 7, I provide a fuel conductor 17, which extends through the bottom side of said body, opening 6 and discharges into the vapor receptacle 7 at the outer side of said extension 12. The other end of said fuel conductor is connected to a suitable source of supply, not shown.

In the operation of my invention, oil or any other suitable fuel is placed in the receiving grooves and ignited, at the same time fuel is supplied to the vapor receptacle through the fuel conductor. The heat from the priming charge will vaporize the fuel in the receptacle at which time said vapor will pass downwardly through the tubular extension 12, opening 6 and into the mixing chamber 5, where it mixes with air which enters the mixing chamber through air inlets 4. The mixed vapor and air will then pass upwardly through the discharge means at which time it will become ignited.

I do not limit my invention to the structure shown and described, as many modifications, within the scope of the appended claims may be made without departing from the spirt of my invention.

What I claim is.

1. In an oil burner, a body provided with an air inlet and a mixing chamber, discharge means communicating with said chamber and an opening in its top communicating with the chamber, a closed vapor receptacle supported by and above said body and having a tubular extension communicating with said opening and projecting into said vapor receptacle and spaced apart from the top thereof, and a fuel conductor extending through the bottom of said body and through said extension and discharging into said receptacle, substantially as set forth.

2. In an oil burner, a body provided with an air inlet and a mixing chamber, discharge means communicating with said chamber and an opening in its top communicating with the chamber, a closed vapor receptacle supported by and above said body and having a tubular extension communicating with said opening and projecting into said vapor receptacle and spaced apart from the top thereof, and a fuel conductor extending through the bottom of said body and through said extension and discharging at the outer side of said extension into said receptacle, substantially as set forth.

In testimony whereof I have signed my name to this specification.

HARRY G. MILLER.